US012436964B2

(12) United States Patent
Samel et al.

(10) Patent No.: US 12,436,964 B2
(45) Date of Patent: Oct. 7, 2025

(54) COMPOSITE EVENT ESTIMATION THROUGH TEMPORAL LOGIC

(71) Applicant: INTERNATIONAL BUSINESS MACHINES CORPORATION, Armonk, NY (US)

(72) Inventors: Karan Manoj Samel, Pleasanton, CA (US); Dharmashankar Subramanian, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 17/235,900

(22) Filed: Apr. 20, 2021

(65) Prior Publication Data

US 2022/0335045 A1 Oct. 20, 2022

(51) Int. Cl.
*G06F 16/2458* (2019.01)
*G06F 16/242* (2019.01)
*G06F 16/248* (2019.01)
*G06N 5/025* (2023.01)
*G06N 20/00* (2019.01)

(52) U.S. Cl.
CPC ...... *G06F 16/2477* (2019.01); *G06F 16/2423* (2019.01); *G06F 16/248* (2019.01); *G06N 20/00* (2019.01); *G06N 5/025* (2013.01)

(58) Field of Classification Search
CPC ............. G06F 16/2477; G06F 16/2423; G06F 16/248; G06N 20/00; G06N 5/025
USPC ....................................................... 707/725
See application file for complete search history.

(56) References Cited

U.S. PATENT DOCUMENTS

| 5,918,200 | A  |   | 6/1999  | Tsutsui et al. |
|-----------|----|---|---------|----------------|
| 7,805,266 | B1 | * | 9/2010  | Dasu ................. G06F 16/24564 702/179 |
| 7,814,021 | B2 | * | 10/2010 | Stamos ................. G06F 21/552 705/52 |
| 8,332,855 | B2 |   | 12/2012 | Dayal          |
| 8,732,161 | B2 |   | 5/2014  | Jain et al.    |

(Continued)

FOREIGN PATENT DOCUMENTS

| CN | 101334845 A   | 12/2008  |              |
|----|---------------|----------|--------------|
| CN | 102790981 A * | 11/2012  | ... H04W 24/00 |

(Continued)

OTHER PUBLICATIONS

Mell, P. et al., "Recommendations of the National Institute of Standards and Technology"; NIST Special Publication 800-145 (2011); 7 pgs.

(Continued)

*Primary Examiner* — Amy Ng
*Assistant Examiner* — Antonio J Caiado
(74) *Attorney, Agent, or Firm* — CHIP LAW GROUP

(57) ABSTRACT

A computer-implemented method of discovering a composite durational event structure through temporal logic includes identifying a plurality of temporally related atomic events from temporal data trajectories of a multivariate dataset according to a definition of an atomic event predicate. At least one composite event having a durational event structure of at least some of the plurality of the temporally related atomic events is discovered by machine learning. An action is performed that is selected from a predetermined list associated with the composite event.

19 Claims, 12 Drawing Sheets

(56) References Cited

U.S. PATENT DOCUMENTS

| | | |
|---|---|---|
| 9,678,811 B2 | 6/2017 | Mutschler |
| 10,054,043 B2 | 8/2018 | Matthews et al. |
| 10,902,337 B1* | 1/2021 | Tang ................. G06F 18/23 |
| 11,263,229 B1* | 3/2022 | Basavaiah ........... G06F 16/2477 |
| 11,631,014 B2* | 4/2023 | Stocker ................ G06N 5/04 706/11 |
| 2012/0197856 A1 | 8/2012 | Banka ................ H04L 67/2885 707/706 |
| 2012/0259895 A1 | 10/2012 | Neely, III et al. |
| 2012/0290879 A1* | 11/2012 | Shibuya ............. G05B 23/021 714/26 |
| 2013/0080117 A1* | 3/2013 | Liu ....................... E21B 47/009 702/183 |
| 2014/0237487 A1 | 8/2014 | Prasanna et al. |
| 2015/0205691 A1* | 7/2015 | Seto ................... G06F 11/3452 702/182 |
| 2016/0077164 A1* | 3/2016 | Toyoshima ............ G01R 31/40 702/58 |
| 2016/0321257 A1* | 11/2016 | Chen ................... G06F 16/783 |
| 2017/0098196 A1 | 4/2017 | Adderly et al. |
| 2017/0206452 A1* | 7/2017 | Herzog ................ G06N 5/04 |
| 2017/0220938 A1* | 8/2017 | Sainani .............. G06F 16/2428 |
| 2018/0174067 A1* | 6/2018 | Spiro ................ G06N 20/00 |
| 2018/0225166 A1* | 8/2018 | Maya .................. G06N 5/045 |
| 2018/0314689 A1* | 11/2018 | Wang ................. G10L 15/1822 |
| 2019/0034497 A1* | 1/2019 | Song ................. G06F 16/9014 |
| 2019/0114339 A1 | 4/2019 | Mineev et al. |
| 2019/0236162 A1* | 8/2019 | Gross ................. G06F 16/2477 |
| 2019/0354836 A1* | 11/2019 | Shah ................. G06N 3/045 |
| 2019/0355082 A1* | 11/2019 | McMillan ........... G16H 50/80 |
| 2020/0097810 A1* | 3/2020 | Hetherington ......... G06N 20/20 |
| 2020/0275875 A1* | 9/2020 | Johnstone .............. A61B 5/165 |
| 2020/0285997 A1* | 9/2020 | Bhattacharyya ......... G06N 7/00 |
| 2020/0342333 A1* | 10/2020 | Sigtermans ........... G06N 20/00 |
| 2020/0372326 A1* | 11/2020 | Oreshkin ............... G06N 3/044 |
| 2020/0389625 A1 | 12/2020 | Mukhopadhyay et al. |
| 2021/0063198 A1* | 3/2021 | Nister ................ G01C 21/3815 |
| 2021/0117384 A1* | 4/2021 | Leite Pinheiro de Paiva .............. G06F 16/9574 |
| 2021/0203157 A1* | 7/2021 | Visweswariah ....... G06F 18/214 |
| 2021/0311131 A1* | 10/2021 | Gundel ................ G01K 7/42 |
| 2021/0373063 A1* | 12/2021 | Gundel ................ G06N 5/04 |

FOREIGN PATENT DOCUMENTS

| | | |
|---|---|---|
| CN | 112653749 A | 4/2021 |
| CN | 117121530 A | 11/2023 |
| GB | 2620538 A | 1/2024 |
| JP | 2016-063590 A | 4/2016 |
| JP | 2024-514625 A | 4/2024 |
| KR | 101042779 B1 | 6/2011 |
| WO | 2021045719 A1 | 3/2021 |
| WO | 2022/222623 A1 | 10/2022 |

OTHER PUBLICATIONS

Girdhar, R. et al., "Cater: A Diagnostic Dataset for Compositional Actions & Temporal Reasoning"; arXiv:1910.04744v2 [cs.CV] (2020); 16 pgs.
International Search Report and Written Opinion issued May 26, 2022 in related application No. PCT/CN2022/079546; 8 pgs.
No Author. "Expanded CodeFusion Studio™", retrieved from https://www.analog.com/en/index.html, dated Apr. 25, 2025, 3 pages.
No Author. "Inspire and engage the next generation of Scientific thinkers", retrieved from https://scienceworld.scholastic.com, dated Apr. 25, 2025, 1 page.
Japan Patent Office, "Notice of Reasons for Refusal" Jun. 12, 2025, 10 Pages, JP Application No. 2023-562923.

* cited by examiner

State Space Construction

- Align all the preprocessed data modalities onto a unified timeline
- Expert rules identification
  - Define a set of base predicate rules that can be evaluated on the state space
  - Predicates are the building blocks of constructing event rules that we are interested in monitoring
- Event detection
  - Events of interest occur over an interval of the timeline, which must be identified in order to apply candidate rules

FIG. 4

COMPOSITE/ATOMIC EVENT IDENTIFICATION

- Given predicates and event intervals, the method identifies atomic events and composite events
- Atomic events are events of interest that take place within the identified intervals
  - Evaluated by constructing a rule composed of base predicates defined earlier
  - Implicitly defined based on knowledge, may not have records in the timeline
- Composite events are intrinsically determined by multiple atomic events in a certain order in the timeline: Supervised Learning, and RL
  - Explicitly defined on the timeline, the system associates the most likely combination and order of events to explain this event

FIG. 5

COMPOSITE EVENT ESTIMATION THROUGH TEMPORAL LOGIC

BACKGROUND

Technical Field

The present disclosure generally relates to systems and methods regarding dynamic multivariate data, and more particularly, to the discovery of composite events having a temporal relation.

Description of the Related Art

With the advent of Artificial Intelligence (AI), there is an increased interest in predictive analytics across many fields including but not limited to video comprehension and audio recognition. One such example is composite event estimation based on dynamic multivariate temporal data over an interval (e.g., $[0, T_i]$ for a trajectory i) involving multiple (M) variables. Within the interval, there are durational events referred to as atomic events. Atomic events correspond to sub-intervals (e.g., within $[0, T_i]$) with a start time and an end time. An atomic event usually has a signature of a time-stamped data over the sub-interval, spanning a subset of the M variables. A collection of the atomic events taken together with a logic temporal relation across the collection is known as a composite event. Deep learning has been attempted to provide composite event estimation to support real-time decisions without success.

For example, a conventional approach to composite event estimation using existing techniques such as deep learning fails to provide a constructive structural and interpretable view of composite events due in part to a reliance on the use of black-box models. The conventional approach also fails to accommodate any domain specific knowledge or inductive bias that may be introduced. The generally poor performance of conventional approaches to benchmark tasks involving composite event detection is a hindrance to supporting real-time decisions.

SUMMARY

According to one embodiment, a computer-implemented method of discovering a composite durational event structure through temporal logic includes identifying a plurality of temporally related atomic events from temporal data trajectories of a multivariate dataset according to a definition of an atomic event predicate. At least one composite event having a durational event structure of at least some of the plurality of the temporally related atomic events is discovered by machine learning. An action is performed that is selected from a predetermined list associated with the composite event. The method enables the identification of the atomic events and discovery of composite events, and to correct or prevent undesirable results.

According to an embodiment, the performed action includes notifying a designated entity from the list associated with the composite event. The designated entity may be a supervisory system that further analyzes the composite event for a response.

According to an embodiment, the temporal data trajectories of the multivariate dataset from which the atomic events are identified by determining input trajectories having at least two variables measured numerically across a time interval. The use of at least two data variables provides for a more accurate analysis of the atomic events.

According to an embodiment, the atomic event predicate is determined based on domain-specific knowledge. The domain specific knowledge can be used to connect and identify high-level patterns with preprocessed temporal data.

According to an embodiment, the multivariate data set is a video dataset, and the identifying of the temporally related atomic events further includes processing a raw time series data of the multivariate dataset, and identifying individual atomic events having a duration of a sub-interval of a time interval of the raw time series data. The raw timeseries data of the multivariate dataset is used for a data ingestion operation to analyze complex data.

According to an embodiment, the atomic event predicate is additionally determined by processing of the raw time-series data of the multivariate dataset. Determining the atomic predicate by processing the raw timeseries data provides for more accurate results.

According to an embodiment, the multivariate dataset includes raw data, and the method further includes learning a corresponding rule structure based on a labeling of the raw data. The raw data labeling facilitates the use of machine learning to construct rules based on predicates.

According to an embodiment, the multivariate dataset includes raw data, and the method further includes ingesting temporal trajectories in the raw data of the multivariate dataset and storing the ingested temporal trajectories as time trajectories in an automatically chosen state space construction. The ingested temporal trajectories are used to provide a more accurate state space storage of the atomic events and composite events.

According to an embodiment, at least one composite event is identified by constructing a timeline of temporally related atomic events, along with their temporal relation. The timeline is used to aid in temporal logic analysis when identifying atomic events and discovering composite events.

According to an embodiment, the timeline is annotated based on the atomic event predicate and sub-intervals on the timeline are localized corresponding to the atomic events. The annotation aids in identifying atomic events and discovering composite events.

According to an embodiment, the durational event structure of the one composite event is learned using the localized sub-intervals on the timeline in a supervised learning operation. Machine learning provides for a more accurate result in which domain specific knowledge and handling of raw data by machine learning can be used to provide for more accurate results.

According to an embodiment, the multivariate dataset includes at least one of a video data set and an audio data set, and the durational event structure of the at least one composite event is learned using the localized sub-intervals on the timeline in a reinforcement learning operation. The learning of the durational event structure is used to construct rules based on predicates to assist in identifying atomic events and discovering composite events. The composite events in video and/or audio datasets is advantageous in fields such as video comprehension and audio recognition.

According to an embodiment, there an analysis of a real-time streaming data is performed. The discovered structure of the composite event is applied in detecting an evolving progression of a particular composite event by determining constituent atomic events and verifying their temporal relations. Catastrophic failures can be prevented and current failures can be mitigated by detecting the evolving progression of a particular composite event.

According to an embodiment, the composite event includes a failure of an electrical grid. The temporally related atomic events include sensor data provided by one or more components of the electrical grid. This application shows some advantages of the present disclosure, such as mitigating and possibly preventing power grid outages.

According to one embodiment, a computing device for discovering a composite durational event structure through temporal logic includes a processor and a memory coupled to the processor. The memory stores instructions to cause the processor to perform acts including discovering a composite durational event structure through temporal logic, the computing device includes identifying a plurality of temporally related atomic events from temporal data trajectories of a multivariate dataset according to a definition of an atomic event predicate. At least one composite event has a durational event structure discovered by machine learning of at least some of the plurality of the temporally related atomic events. An action is performed that is selected from a predetermined list associated with the composite event. The computing device enables the identification of the atomic events, discovery of composite events, and corrects or prevents undesirable results.

In an embodiment, the instructions cause the processor to perform an additional act to identify the composite event by constructing a timeline of temporally related atomic events, along with their temporal relation. The timeline is annotated using the atomic event predicate and sub-intervals on the timeline that corresponds to the atomic events are localized. The timeline is used to aid in temporal logic analysis when identifying atomic events and discovering composite events.

According to one embodiment, a non-transitory computer readable storage medium tangibly embodying a computer readable program code having computer readable instructions that, when executed, causes a computer device to carry out a method for discovering a composite durational event structure through temporal logic. The method includes identifying a plurality of temporally related atomic events from temporal data trajectories of a multivariate dataset according to a definition of an atomic event predicate, discovering by machine learning at least one composite event having a durational event structure of at least some of the plurality of the temporally related atomic events. An action selected from a predetermined list associated with the composite event is performed. The method enables the identification of the atomic events, discovery of composite events, and correction or prevention of undesirable results.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 4 illustrates state space construction, consistent with an illustrative embodiment.

FIG. 5 illustrates a composite/atomic event identification, consistent with an illustrative embodiment.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high level, without detail, to avoid unnecessarily obscuring aspects of the present teachings.

In an overview, the identifying of individual unobserved events that make up observed composite events in a timeline can be first performed. For example, a raw time series data is processed to identify individual events in the time series. Logical rules are constructed through a base set of predicate rules to classify individual events. Through machine learning, the logical rules are further combined to identify which of the individual events comprise the observed composite events. The logical rules provide an interpretable view in which underlying temporal events (e.g., the individual events) can lead to the observed events. Machine learning is used to construct composite rules and to provide tuning with new data over time.

There are many temporal sources of information containing many durational events. Composite events are a temporal logical combination of individual atomic events. The present disclosure provides a computer-implemented method and computing device particularly configured to discover the underlying structure/make-up of composite events. To discover the composite event, an identification is provided of each of the corresponding atomic events and their logical temporal relation in combining to form the composite event.

In the present disclosure, underlying composite rules are uncovered through the use of labeled data. For example, temporal relational networks can be used by first learning the temporal relations between atomic events and learning the rule structure given labeled composite events.

Figure 1:
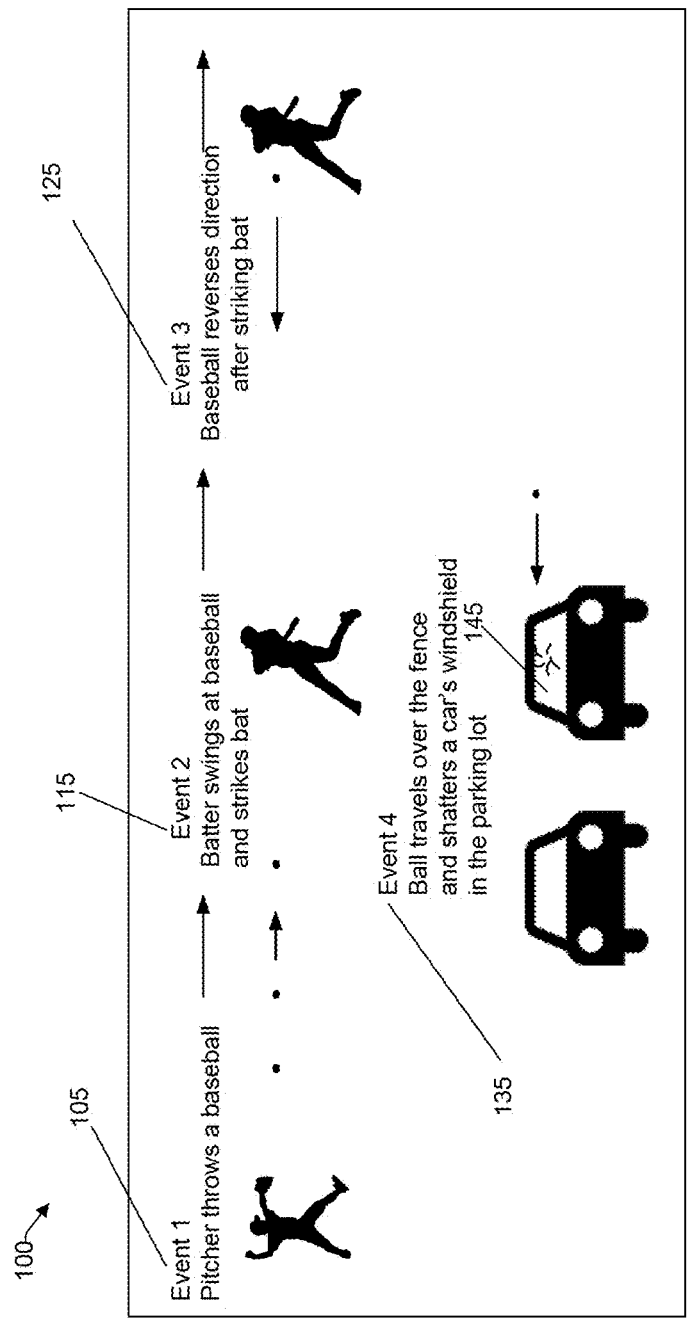
FIG. 1 is an overview illustrating complex temporal data, consistent with an illustrative embodiment.

FIG. 1 is an overview 100 illustrating complex temporal data, consistent with an illustrative embodiment. It is to be understood that FIG. 1 is provided for explanatory purposes without limitation. In FIG. 1, the complex temporal data depicts a composite event that is a compilation of atomic events. In this case, an automobile 101 has a windshield 145 that is shattered by a baseball 110. However, the shattering of the windshield can be considered to be a composite event of four atomic events. In the first atomic event 105, a pitcher throws a baseball 110 toward a batter. In the second atomic event 115, a batter swings at the baseball 110. In atomic event 3, the baseball 110 is hit by the bat and reverses the direction of travel. In atomic event 4, the baseball 110 travels over the fence and strikes the automobile 101 in the parking lot, and shatters the windshield 145. Although only four atomic events are shown in FIG. 1, the number of atomic events that make the composite event depends in part on the complexity of the composite event, and there can be virtually any number of atomic events. There is a start time and an end time for the composite event and for each of the atomic events.

While the aforementioned composite event in FIG. 1 has a clear presentation of the atomic events, in the real-world there can be a considerable amount of "noise" that hinders the discovery of composite events. In the case of a complex time series, it is noted that such complex time series data may have intrinsic entropies and involve multiple time scales. Thus, the analysis of raw data, such as in a raw dataset, to discover composite events and identify the atomic event that makes up the composite events using domain specific knowledge and machine learning to perform raw data analysis is heretofore unknown. A raw dataset includes many different types of information such as event data, and the discovery of particular events in temporal sources of information containing many durational events utilizes a complex analysis.

The approaches to discover composite events used may include but are not limited to time series ingestion, state space construction, and/or a composite/atomic event identification. According to the present disclosure, composite event detection is performed in unifying handling of both raw temporal data which pure learning-based models strive, and the current domain knowledge provided to connect and identify high-level patterns with the pre-processed temporal data. Leveraging both approaches to detect composite events has shown to be more accurate than either method alone.

The computer-implemented method and computer device of the present disclosure advantageously provides an interpretable construction of a composite event definition and includes associated domain knowledge. There is an improvement in composite event detection because a benchmark task performance evaluation test involving composite event detection has enhanced results in terms of speed and accuracy versus conventional techniques that use black-box models.

The computer-implemented method and computing device of the present disclosure also provides a number of improvements in the field of predictive analysis by discovering the structure of various composite labels in terms of their respective atomic events and their mutual temporal relations that were previously unknown in the art. Also, the teachings of the present disclosure provides for the use of the acquired structural knowledge for interpretable real-time detection and interpretable real-time mitigation of ongoing composite events in complex dynamic systems. By virtue of the teachings herein, a reduction in processing overhead and storage can be realized, as well as a reduction in power consumed.

Additional advantages of the computer-implemented method and device of the present disclosure are disclosed herein.

Example Embodiment

Figure 2:
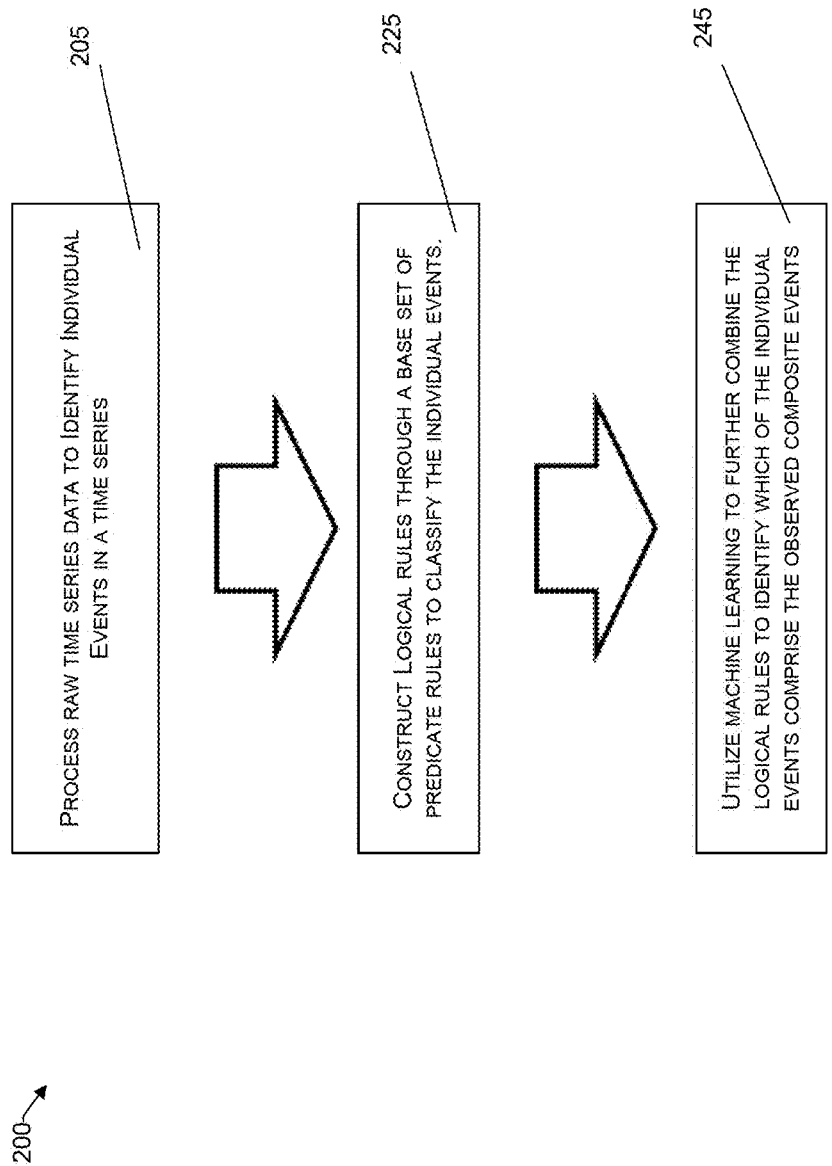
FIG. 2 is a conceptual block diagram of the computer-implemented method for composite event estimation through temporal logic, consistent with an illustrative embodiment.

FIG. 2 illustrates a conceptual block diagram 200 at operation 205 that individual events in a time series are defined by processing raw time series data. The raw time series data may be virtually any data having start and end times. For example, motion data, video data, audio data, digital logged data, streaming sensors, or temperature data are just a few of the non-limiting data that can make up the time series. The identifying of the individual events in the time series is particularly beneficial for disciplines such as video comprehension and audio recognition. However, the artisan is to understand that the computer-implemented method and apparatus of the present disclosure is applicable to many other fields.

At operation 225 logic rules are constructed through a base set of predicate rules. Occurring events have underlying logic that dictates the presence or absence of that event. Such predicate rules may have been previously created, for example, by an administrative application and/or via an administrator or subject matter expert (SME). The administrative application and/or SME can define the composition of a base set of predicate rules that identify these events given the information available from the state space. The logical rules are used to classify the individual events identified in the time series.

With regard to an example of a base set of predicate rules, if a power grid operation is observed, a possible composite event is a failed transformer. A base predicate that can be applied is that excessive current above some threshold leads to a transformer malfunction. Additional data modalities such as temperature sensors indicate more energy is used for cooling in a heatwave, thus leading to a potential malfunction of the power grid. Also, the temperature of a transformer may raise to a level that is associated with equipment failure and can be another rule of the base set of predicate rules.

At operation 245 machine learning is utilized to further combine the logical rules to identify which of the individual events make up the observed composite events. In this illustrative embodiment, the machine learning is supervised with certain representative event data being labeled. However, Reinforcement Learning (RL) may also be used. RL may be configured with a learning agent that interacts with an environment and to observe basic behaviors. RL can be used to perform various operations including, for example, exploration, exploitation, Markov's decision processes, deep learning, policy learning, value learning, etc.

Figure 3:
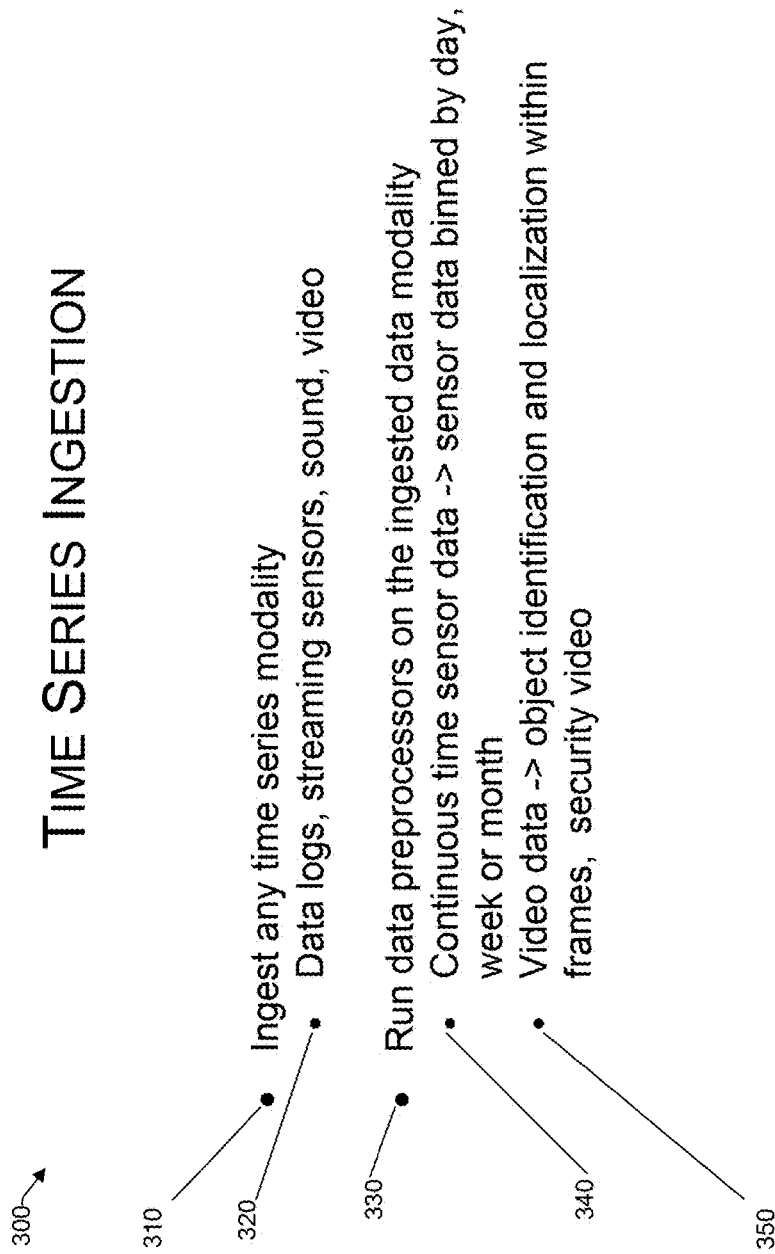
FIG. 3 illustrates a time series ingestion, consistent with an illustrative embodiment.

FIG. 3 illustrates a time series ingestion 300, consistent with an illustrative embodiment. Some of the attributes of a time series ingestion are that any time series modality can be ingested 310. The timeseries data can be arranged in a timeline in many forms. For example, timeline data can include but is not limited to data logs, streaming sensors, audio, or video 320.

With continued reference to FIG. 3, a composite event detection device according to the present disclosure can operate with one or more data modalities for a given data preprocessor. For example, data preprocessors can be run on an ingested data modality 330 and can be used to transform raw timeseries data into a format that can be queried. In the case of continuous-time sensor data 340, such sensor data can be binned by day, week, or month. The binning transforms the raw sensor data into a searchable form. Raw sensor data are value streams, such as temperature measurement, pressure measurement, etc. Data preprocessing can be used to aggregate the temperature or pressure by the minute, hour, day, etc. Moreover, in the case of video data 340, object identification and localization can be performed within frames. Ingested data modality from a security video can also be data preprocessed. It is to be understood that the aforementioned non-limiting examples have been discussed for illustrative purposes. There are many types of ingested data that may be preprocessed. The data preprocessors are typically modality-specific.

FIG. 4 illustrates a state space construction 400, consistent with an illustrative embodiment. A state space database indicates the state of a system's overall points in a time period. In the case of preprocessed time series data (discussed with regard to FIG. 3), such preprocessed data are combined into a single database that is searchable (e.g., can be queried) by rules. A state space database in an aggregation of all the preprocessed data modalities aligned on a continuous timeline 405. The state space can be queried to identify where along a timeline that an event occurred. There are expert rules identification 420 in which a set of predicate rules are defined 425 for evaluation of the state space database. The predicate rules are the building blocks for constructing event rules for items to be monitored. Event detection 430 can be used to predict an event such as an equipment failure, and the predicate rules are applied on the state space database to retrieve information regarding an event. Events of interest 435 occur over an interval of the timeline, which are identified to apply candidate rules. It is to be understood that the events of interest are detected to run candidate rules on and avoid applying the candidate rules over the entire state space, which can be infinitely large. Thus, a savings in computational processing time and power is achieved.

FIG. 5 illustrates composite/atomic event identification 500, consistent with an illustrative embodiment. For a given state space construction such as discussed with regard to FIG. 4, there are given predicates and event intervals 505 that are used to identify atomic events and composite events. The atomic events of interest 510 occur within identified intervals. Such events are evaluated by constructing rule 515 using base predicates previously defined. The atomic events can be implicitly defined based on knowledge 520, and may not have records in the timeline.

The composite events are intrinsically determined 525 by identifying multiple atomic events in order in the timeline. The composite events are determined by, for example, utilizing supervised learning or reinforcement learning. A system associates the most likely combination and order of events to explain the identification of a composite event. In the case of event prediction, a computer framework will apply previously defined rules on a detected event. Such rules may be been previously defined by a subject matter expert.

Figure 6:
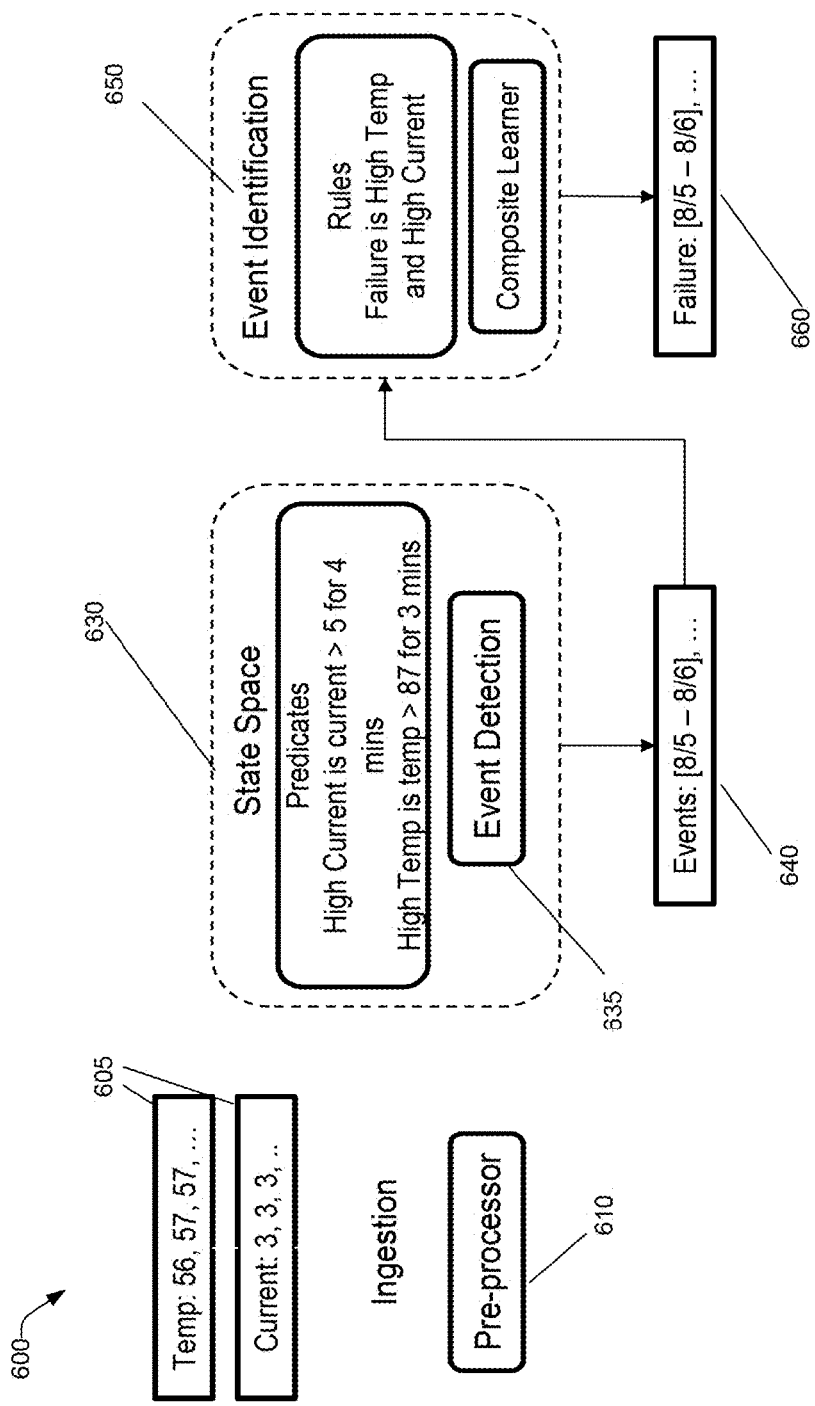
FIG. 6 is an illustration of power grid data being monitored for event identification, consistent with an illustrative embodiment.

FIG. 6 is an illustration of a power grid data being monitored for event identification 600, consistent with an illustrative embodiment. A base predicate that can be applied is that excessive current above some threshold that leads to a transformer malfunction. Additional data modalities such as temperature sensing indicate that more energy is used for cooling in a heatwave, thus leading to a potential malfunction. A power grid (such as shown in FIG. 7) can be monitored for temperature and current values to detect or predict a failure in operations and to enable the undertaking of corrective or preventive action.

With continued reference to FIG. 6, at 605 it is shown that temperature (56-57 degrees Celsius) and a value of current (3 kA) in power lines of the grid are being measured by sensors. The temperature data and current data are two types of modalities ingested by a pre-processor 610. The preprocessor 610 transforms the raw data of the temperature and current in a searchable form in the state space database 630. The power grid monitoring has, in this example, at least two predicate rules. High current is a current value greater than 5 kA for 4 minutes. High temperature is a temperature greater than 87 degrees Celsius for three minutes. An event detection operation 635 detects events according to the predicate rules, such as the atomic events 640. An event identification operation 650 is performed based on the rules that failures are defined as high temperature and high current at the values specified by the predicates. A composite learner analyzes the atomic events 640, and based on the rules, identifies a failure 660 that is a composite event of the atomic events 640. Another action may then be performed, such as notification, activate an alarm, recommend corrective or preventive action, etc.

Figure 7:
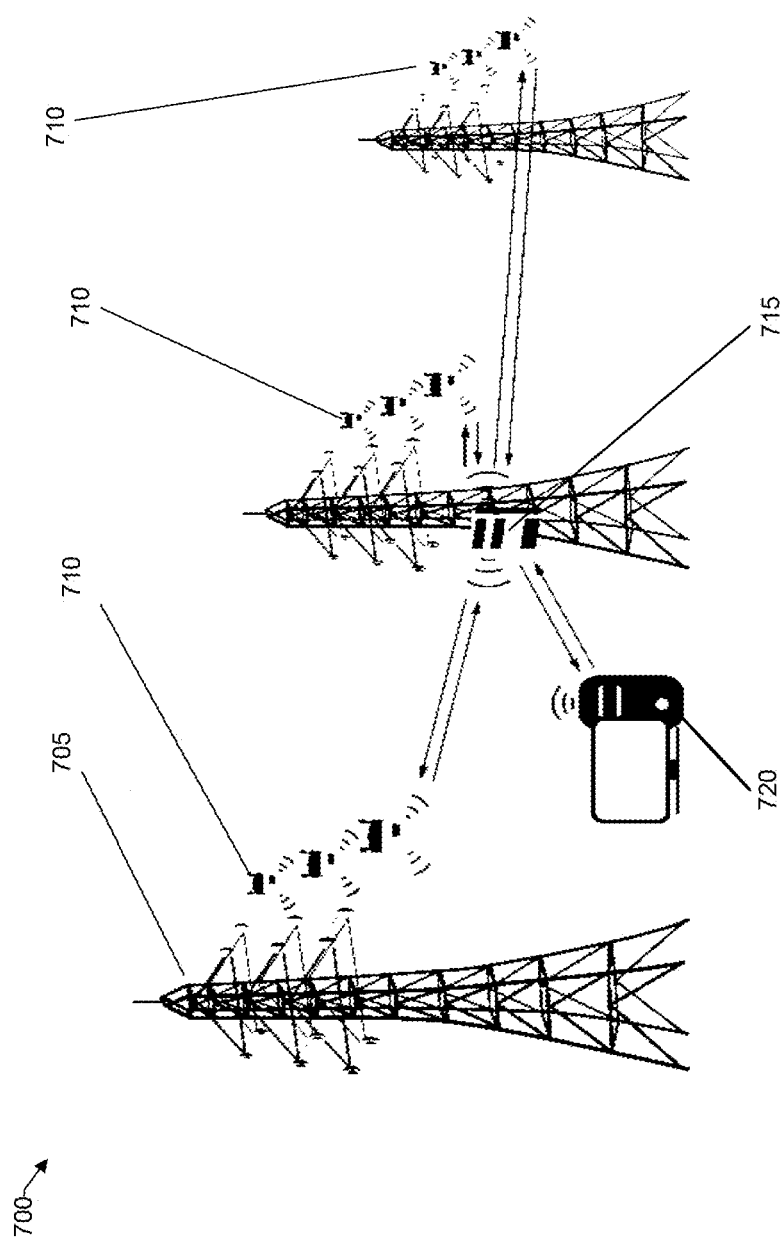
FIG. 7 illustrates the power grid of FIG. 6, consistent with an illustrative embodiment.

FIG. 7 illustrates the power grid 700 of FIG. 6, consistent with an illustrative embodiment. The towers 705 are used to support power lines and contain sensors 710 that can monitor items such as temperature and current in kA. For certain intervals of the grid, there can be a wireless transmitter 715 for the sensor data to be provided to a server 720 for data ingestion as previously discussed herein.

Figure 8:
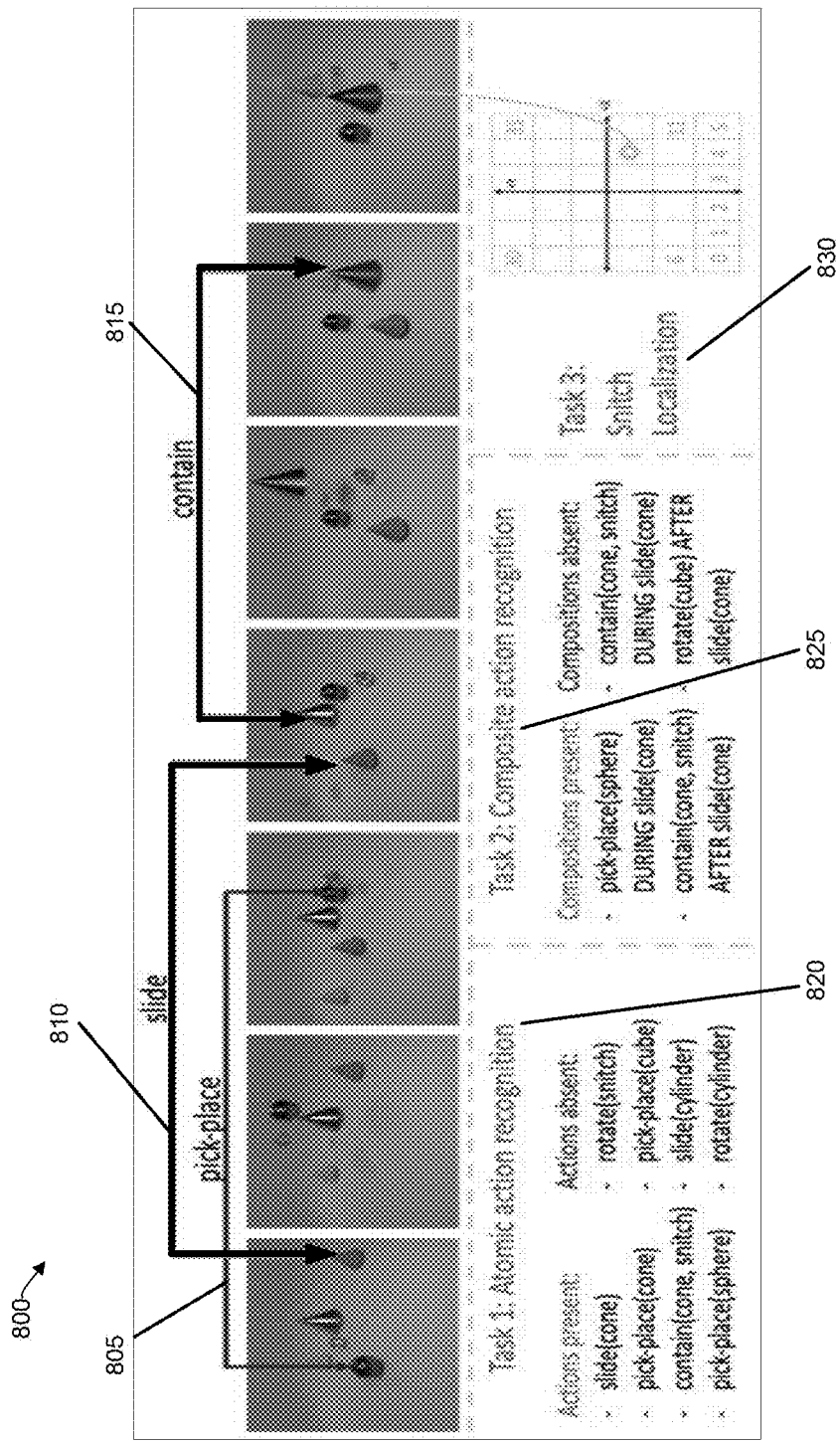
FIG. 8 illustrates several images of individual atomic events of a synthetic video dataset, consistent with an illustrative embodiment.

FIG. 8 illustrates several images of individual atomic events of a synthetic video dataset 800, consistent with an illustrative embodiment. It is to be understood that the present disclosure is shown in this embodiment as being applied to synthetic video data for teaching purposes, the identifying of individual events as atomic events of a composite event are applicable to a multivariate video dataset, audio dataset, or a combination thereof. For example, a composite event can be a combination of audio atomic events and video atomic events that are temporally related. Three of the actions illustrated in the synthetic video include a pick-place 805 (e.g., pick up and place), a slide 810, and a "contain" 815. Some of the items in the video are a cone, a sphere, and a snitch. The first task is an atomic recognition event 820, and as shown there, is performed by comparison of the synthetic frames a slide 810, a pick-place 805, and a contain 815. The atomic events are a conjunction of movements and the differently shaped objects, as well as temporal predicates such as before, during, and after. The second task is a composite recognition event 825 that includes performing a pick-place action during a slide, as well as performing a contain action after a slide action. The composite recognition event 825 is made of temporal predicates between two atomic events. The third task shows identifying a snitch localization 830 on a graph. The synthetic video dataset 800 is an example of a multi-label classification problem with a goal being to recover the underlying atomic events leading to the composite events.

Example Process

Figure 9:
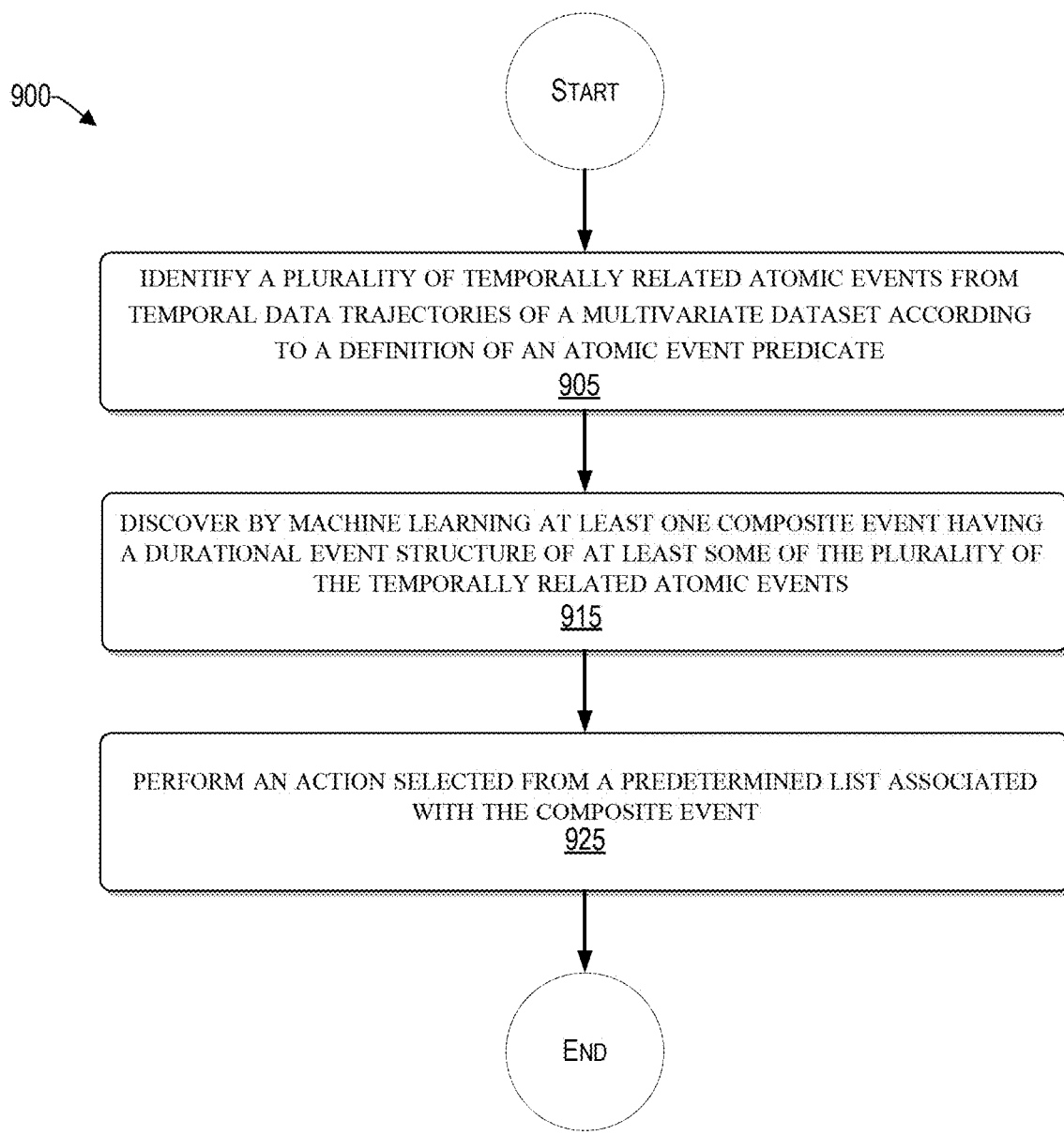
FIG. 9 is a flowchart illustrating a computer-implemented method of discovering a composite durational event structure through temporal logic, consistent with an illustrative embodiment.

With the foregoing overview of the example architecture, it may be helpful now to consider a high-level discussion of an example process. To that end, FIG. 9 depicts a flowchart 900 illustrating various aspects of a computer-implemented method, consistent with an illustrative embodiment. FIG. 9 is shown as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

FIG. 9 is a flowchart 900 illustrating a computer-implemented method of discovering a composite durational event structure through temporal logic, consistent with an illustrated embodiment.

At operation 905, a plurality of temporally related atomic events is identified from temporal data trajectories of a multivariate dataset according to a definition of an atomic event predicate. The atomic event predicate is determined based on domain-specific knowledge that may have been previously provided by an expert. The atomic event predicate may be additionally determined by processing of the raw time series data of the multivariate dataset. If supervised data is available for atomic events, the atomic event predicates can be automatically learned over the raw timeseries events of interest without any input from a subject matter expert (SME).

The leveraging to detect composite events using raw temporal data (raw timeseries data) and current domain knowledge to connect and identify high-level patterns with pre-processed temporal data provides more accuracy than either approach alone. A data preprocessor can be used to transform the raw data into a form that can be queried by rules in the system.

At operation 915, machine learning is used to discover at least one composite event having a durational event structure of at least some of the plurality of the temporally related atomic events. The type of machine learning used may be supervised learning or reinforcement learning. The machine learning is used to construct composite rules based on the atomic predicate and may also be used to further tune the rules periodically and/or in response to receiving new data.

At operation 925, an action is performed that may be selected from a predetermined list of actions. Such actions may be specific to the composite event. For example, the action may be notifying a designated entity that an event has occurred, or warning that a composite event may occur in the near-future based on the atomic events identified within a certain time frame. The applications are virtually unlimited, and as previously discussed, a power grid failure is but one non-limiting example. The action can be to store the discovered composite event and/or to take action in response to the composite event that may involve far more than notification. The operations 905 through 925 may be performed repeatedly.

Example Particularly Configured Computer Hardware Platform

Figure 10:
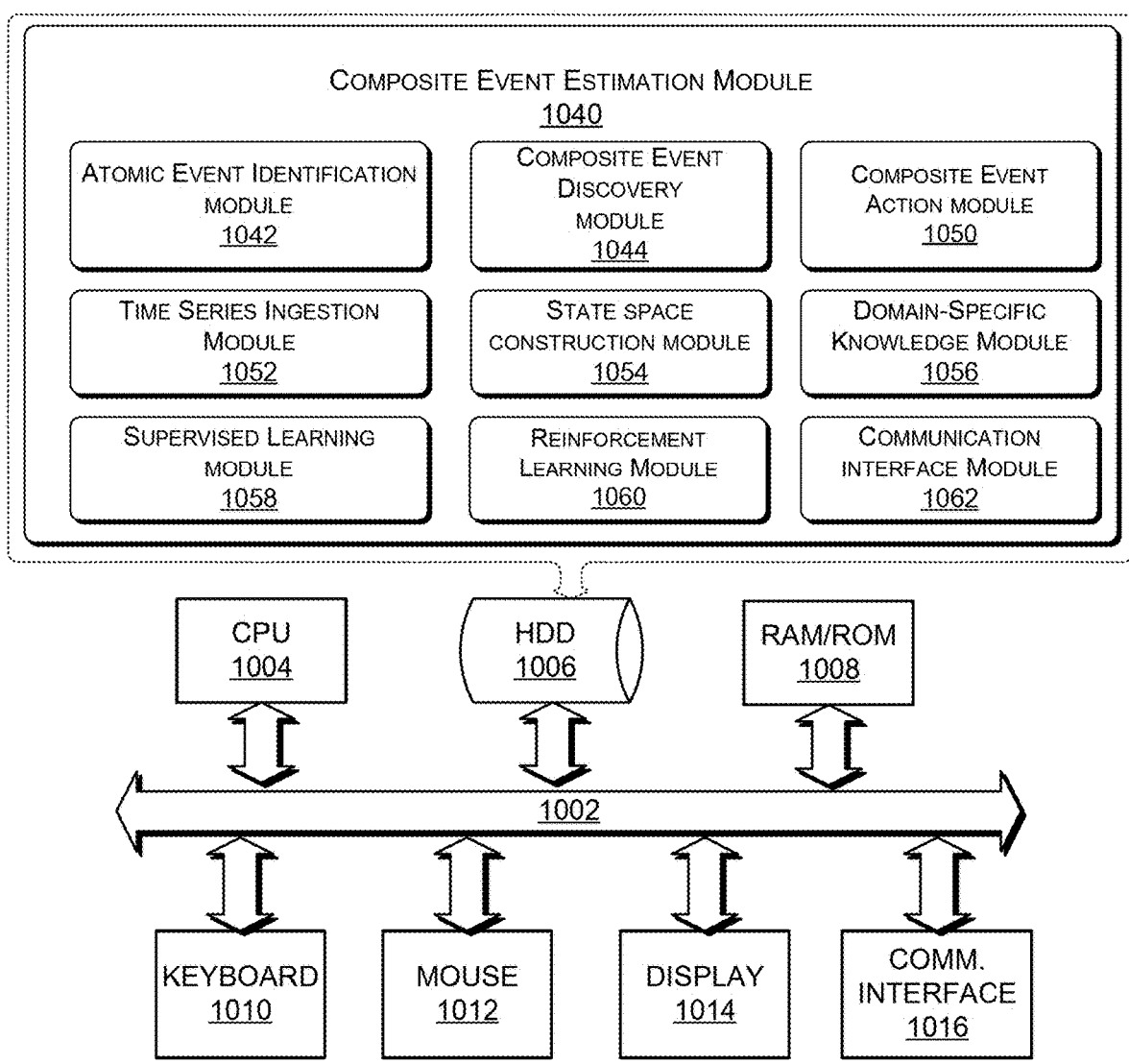
FIG. 10 is a functional block diagram illustration of a computer hardware platform, consistent with an illustrative embodiment.

FIG. 10 provides a functional block diagram illustration 1000 of a computer hardware platform. In particular, FIG. 10 illustrates a particularly configured network or host computer platform 1000, as may be used to implement the method shown in FIG. 9.

The computer platform 1000 may include a central processing unit (CPU) 1004, a hard disk drive (HDD) 1006, random access memory (RAM) and/or read-only memory (ROM) 1008, a keyboard 1010, a mouse 1012, a display 1014, and a communication interface 1016, which are connected to a system bus 1002. The HDD 1006 can include data stores.

In one embodiment, the HDD 1006 has capabilities that include storing a program that can execute various processes, such as machine learning, predictive modeling, classification, updating model parameters. The ML model generation module 1040 is configured to generate a machine learning model based on at least one of the generated candidate machine learning pipelines.

With continued reference to FIG. 10, there are various modules shown as discrete components for ease of explanation. However, it is to be understood that the functionality of such modules and the quantity of the modules may be fewer or greater than shown. A composite event estimation module 1040 consistent with an illustrative embodiment includes an atomic event module 1042 configured to identify a plurality of temporally related atomic events from temporal data trajectories of a multivariate dataset according to a definition of an atomic event predicate. A composite event discovery module 1044 is configured to discover a composite event having a durational event structure of at least some of the plurality of the temporally related atomic events identified by the atomic event identification module 1042.

A composite event action module 1050 is configured to perform an action associated with the composite event. The action may be selected from a predetermined list of actions. A time series ingestion module 1052 is configured to ingest any time series modality including but not limited to data logs, streaming sensor, audio data, and/or video data, and execute data preprocessing on the ingested modality. The data preprocessing transforms the raw timeseries data into a searchable form via queries.

A state space construction module 1054 is configured to align the preprocessed modalities onto a unified timeline provide expert rules identification by defining a set of base predicate rules that can be evaluated in the state space database, and for event detection as events of interest occur over an interval of the timeline.

A domain-specific knowledge module 1056 includes the domain specific knowledge loaded into a storage regarding a particular subject associated with data being analyzed for atomic events and composite events. A supervised learning module 1058 and the reinforcement learning module 1060 are respectively configured with respective types of machine learning used for composite event discovery, creating and tuning of the rules, and update based on new data being analyzed. It is to be understood that there is no capability requirement for both supervised learning and reinforced learning in the composite event estimation module 1040. The communication interface module 1062 is configured to communicate, for example, with sources that are providing streaming data such as sensors, etc.

Example Cloud Platform

As discussed above, functions relating to the low bandwidth transmission of high definition video data may include a cloud. It is to be understood that although this disclosure includes a detailed description of cloud computing as discussed herein below, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 11:
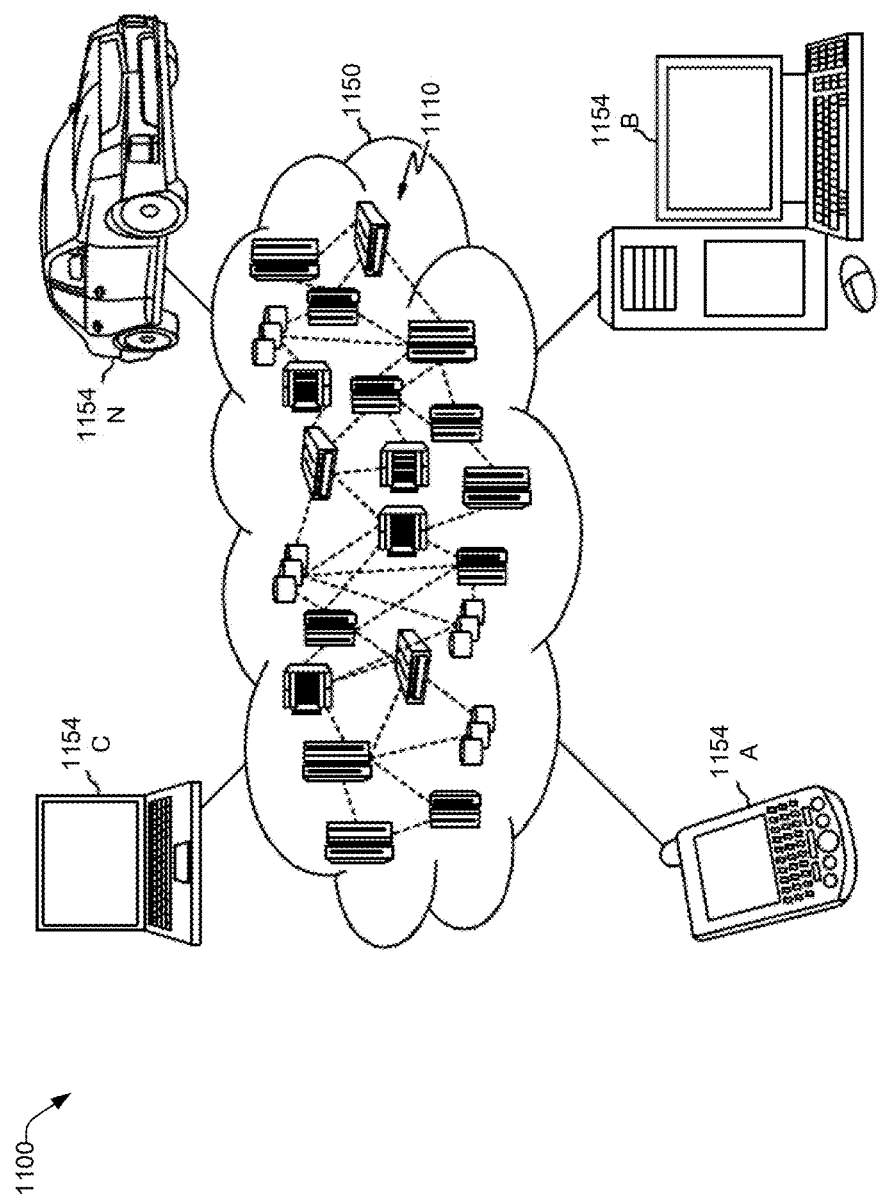
FIG. 11 depicts an illustrative cloud computing environment, consistent with an illustrative embodiment.

Referring now to FIG. 11, an illustrative cloud computing environment 1100 utilizing cloud computing is depicted. As shown, cloud computing environment 1100 includes cloud 1150 having one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms, and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1100 can communicate with any type of computerized device over any type of network and/or network addressable connection (e.g., using a web browser).

Figure 12:
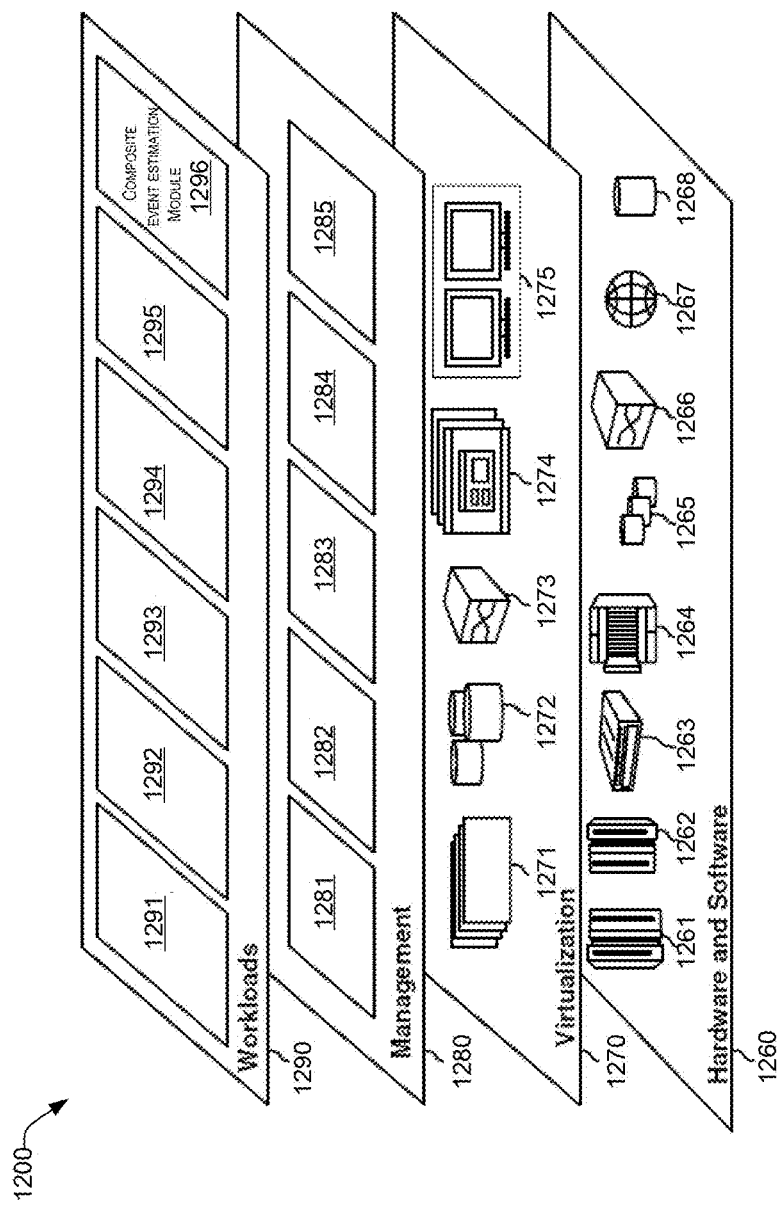
FIG. 12 depicts a set of functional abstraction layers provided by a cloud computing environment, consistent with an illustrative embodiment.

Referring now to FIG. 12, a set of functional abstraction layers 1200 provided by cloud computing environment 1200 (FIG. 12) is shown. It should be understood in advance that the components, layers, and functions shown in FIG. 12 are intended to be illustrative only and embodiments of the disclosure are not limited thereto. As depicted, the following layers and corresponding functions are provided:

Hardware and software layer 1260 include hardware and software components. Examples of hardware components include: mainframes 1261; RISC (Reduced Instruction Set Computer) architecture-based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and a composite event estimation module 1296 configured to perform the identification of temporally related atomic events and discover a composite event made up of the atomic events, as discussed herein above.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of discovering a composite durational event structure through temporal logic to predict, mitigate, or prevent a failure condition of an electrical grid system, the method comprising:

for each data modality of a time series, transforming the time series data into a multivariate dataset that can be automatically queried, using one or more modality-specific preprocessors, wherein each modality-specific preprocessor applies a structured transformation based on predefined rules tailored to the respective modality;

identifying, via a trained machine learning model, a plurality of temporally related atomic events from temporal data trajectories of the multivariate dataset, according to a definition of an atomic event predicate rule that specifies temporal relationships and threshold conditions;

discovering, by the machine learning model, at least one composite event having a durational event structure of at least some of the plurality of the temporally related atomic events, wherein the durational event structure is determined based on machine learned time-dependent correlations between atomic events;

generating, by the trained machine learning model, a composite event classification by combining predicate rules that determine which of the plurality of temporally related atomic events make up the at least one composite event, wherein the predicate rules are learned and refined by the trained machine learning model based on historical event patterns;

performing a system control action of the electrical grid system selected from a predetermined list associated with the at least one composite event comprising at least one of mitigating a current failure of the electrical grid system or preventing an impending failure of the electrical grid system, based on the composite event classification and the identified atomic events that make up the composite event, wherein:

the at least one composite event comprises a failure of the electrical grid system; and the temporally related atomic events include real-time sensor data collected from distributed components of the one or more components of the electrical grid system.

2. The computer-implemented method of claim 1, wherein the performed action comprises notifying a designated entity from the list associated with the composite event.

3. The computer-implemented method of claim 1, wherein the temporal data trajectories of the multivariate dataset from which the atomic events are identified by determining input trajectories comprise at least two variables measured numerically across a time interval.

4. The computer implemented method of claim 1, wherein the atomic event predicate is determined based on a domain-specific knowledge.

5. The computer-implemented method of claim 4, wherein the multivariate data set comprises a video dataset, and the identifying of the temporally related atomic events further comprises:

processing a raw timeseries data of the multivariate dataset; and identifying individual atomic events having a duration of a sub-interval of a time interval of the raw time series data.

6. The computer-implemented method of claim 5, further comprising additionally determining the atomic event predicate by processing the raw time series data of the multivariate dataset.

7. The computer-implemented method of claim 4, wherein the multivariate dataset comprises raw data; and the method further comprising learning a corresponding rule structure based on a labeling of the raw data.

8. The computer-implemented method of claim 7, further comprising:

ingesting temporal trajectories in the raw data of the multivariate dataset; and storing the ingested temporal trajectories as time trajectories in an automatically chosen state space construction.

9. The computer-implemented method of claim 4, further comprising identifying the at least one composite event by constructing a timeline of temporally related atomic events, along with their temporal relation.

10. The computer-implemented method of claim 9, further comprising:

annotating the timeline based on the atomic event predicate; and localizing one or more sub-intervals on the timeline corresponding to the atomic events.

11. The computer-implemented method of claim 10, further comprising learning the durational event structure of the at least one composite event using the localized sub-intervals on the timeline in a supervised learning operation.

12. The computer-implemented method of claim 10, further comprising learning the durational event structure of the at least one composite event using the localized sub-intervals on the timeline in a reinforcement learning operation.

13. The computer-implemented method of claim 1, further comprising:

applying the discovered durational event structure of the at least one composite event by analyzing the real-time streaming data; and detecting an evolving progression of a particular composite event by detecting constituent atomic events and verifying the temporal relations among the atomic events.

14. A computing device configured to discover a composite durational event structure through temporal logic to predict, mitigate, or prevent a failure condition of an electrical grid system, the computing device comprising:

a processor;

a memory coupled to the processor, the memory storing instructions to cause the processor to perform acts comprising:

for each data modality of a time series, transforming the time series data into a multivariate dataset that can be automatically queried, using one or more modality-specific preprocessors, wherein each modality-specific preprocessor applies a structured transformation based on predefined rules tailored to the respective modality;

identifying, via a trained machine learning model, a plurality of temporally related atomic events from temporal data trajectories of the multivariate dataset according to a definition of an atomic event predicate rule that specifies temporal relationships and threshold conditions;

discovering, by the machine learning model, at least one composite event having a durational event structure of at least some of the plurality of the temporally related atomic events, wherein the durational event structure is determined based on machine learned time-dependent correlations between atomic events;

generating, by the trained machine learning model, a composite event classification by combining predicate rules that determine which of the plurality of temporally related atomic events make up the at least one composite event, wherein the predicate rules are learned and refined by the trained machine learning model based on historical event patterns; and performing an action selected from a predetermined list associated with the composite event comprising at least one of mitigating a current failure of the electrical grid system or preventing a failure of the electrical grid system, wherein:
the at least one composite event comprises a failure of the electrical grid system; and
the temporally related atomic events include real-time sensor data collected from distributed components of the one or more components of the electrical grid system.

15. The computing device of claim 14, wherein the instructions cause the processor to perform additional acts, comprising:
identifying the at least one composite event by constructing a timeline of temporally related atomic events, along with the temporal relations among the atomic events;
annotating the timeline using the atomic event predicate; and
localizing sub-intervals on the timeline corresponding to the temporally related atomic events.

16. The computing device of claim 14,
wherein the atomic event predicate is based on a domain-specific knowledge; and
the instructions cause the processor to perform additional acts comprising:
identifying the temporally related atomic events by processing a raw timeseries data of the multivariate dataset; and
identifying individual atomic events having a duration of a sub-interval of a time interval of the raw time series data.

17. The computing device of claim 16, wherein the multivariate dataset includes at least one of a video data set and an audio data set, and the instructions cause the processor to perform an additional act comprising:
learning the durational event structure of the at least one composite event using the localized sub-intervals on the time line in a reinforcement learning operation.

18. The computing device of claim 16, wherein the instructions cause the processor to perform an additional act comprising:

learning the durational event structure of the at least one composite event using the localized sub-intervals on the timeline in a supervised learning operation.

19. A non-transitory computer readable storage medium tangibly embodying a computer readable program code having computer readable instructions that, when executed, causes a computer device to carry out a method of discovering a composite durational event structure through temporal logic to predict, mitigate, or prevent a failure condition of an electrical grid system, the method comprising:
for each data modality of a time series, transforming the time series data into a multivariate dataset that can be automatically queried, using one or more modality-specific preprocessors, wherein each modality-specific preprocessor applies a structured transformation based on predefined rules tailored to the respective modality;
identifying, via a trained machine learning model, a plurality of temporally related atomic events from temporal data trajectories of the multivariate dataset, according to a definition of an atomic event predicate rule that specifies temporal relationships and threshold conditions;
discovering, by the machine learning model, at least one composite event having a durational event structure of at least some of the plurality of the temporally related atomic events, wherein the durational event structure is determined based on machine learned time-dependent correlations between atomic events;
generating, by the trained machine learning model, a composite event classification by combining predicate rules that determine which of the plurality of temporally related atomic events make up the at least one composite event, wherein the predicate rules are learned and refined by the trained machine learning model based on historical event patterns; and
performing an action selected from a predetermined list associated with the composite event comprising at least one of mitigating a current failure of an electrical grid system or preventing a failure of the electrical grid system.

* * * * *